US006554225B1

(12) United States Patent
Anast et al.

(10) Patent No.: US 6,554,225 B1
(45) Date of Patent: Apr. 29, 2003

(54) COMMERCIAL AIRCRAFT LOW COST, LIGHTWEIGHT FLOOR DESIGN

(75) Inventors: Peter Z. Anast, Sammamish, WA (US); Rickie Hansken, Bothell, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/171,608

(22) Filed: Jun. 14, 2002

(51) Int. Cl.[7] ................................................. B64C 1/00
(52) U.S. Cl. ............................... 244/117 R; 244/118.1; 244/119; 105/422; 114/76
(58) Field of Search .......................... 244/117 R, 118.1, 244/119, 129.1; 105/422; 114/76

(56) References Cited

U.S. PATENT DOCUMENTS

| | | | | |
|---|---|---|---|---|
| 3,361,401 A | * | 1/1968 | Hanifan | 410/156 |
| 4,479,621 A | * | 10/1984 | Bergholz | 244/117 R |
| 6,039,288 A | * | 3/2000 | Huber et al. | 244/118.1 |
| 6,364,250 B1 | * | 4/2002 | Brinck et al. | 244/119 |
| 6,427,945 B1 | * | 8/2002 | Bansemir | 244/129.1 |

* cited by examiner

Primary Examiner—J. Woodrow Eldred
(74) Attorney, Agent, or Firm—Harness, Dickey & Pierce P.L.C.

(57) ABSTRACT

An aircraft deck support system includes horizontal deck support beams connected to the aircraft's frames. Each deck support beam has a plurality of machined, generally T-shaped supports. Each T-shaped support includes either a horizontal recess or a raised surface formed in a deck support beam upper chord and a U-shaped aperture formed in a beam web. The T-shaped support matably receives a cross-support beam attachment flange perpendicularly aligned with the deck support beams. Each cross-support beam includes a web perpendicularly connected at an upper end to the attachment flange, and a stiffening flange at a web lower end. Both the web and the stiffening flange are freely suspended within the U-shaped aperture of the T-shaped support. When joined, the cross-support beam seats on the T-shaped support allowing both the cross-support beam and the deck support beam to develop maximum bending moments at a reduced structural weight.

28 Claims, 7 Drawing Sheets

COMMERCIAL AIRCRAFT LOW COST, LIGHTWEIGHT FLOOR DESIGN

FIELD OF THE INVENTION

The present invention relates to deck support structures adapted for use in mobile platforms, and more specifically to an aircraft deck support structure for seating decks or cargo decks.

BACKGROUND OF THE INVENTION

An aircraft deck design typically comprises a plurality of deck support beams which run in an inboard/outboard direction and are attached at individual frames to the aircraft. The major components of each deck support beam are an upper chord which supports deck plating, and a lower chord generally arranged in parallel with the upper chord and separated from the upper chord by a web. At selected spaced intervals along each of the deck support beams, each of a plurality of I-shaped, J-shaped, C-shaped or H-shaped beams are positioned at about 90° angles to the deck support beams. For simplicity, the I-shaped, J-shaped, C-shaped or H-shaped beams will hereinafter be referred to as cross-support beams. In many aircraft designs, the cross-support beams are arranged in a fore/aft direction and partially support deck plating in either a passenger compartment or a cargo stowage compartment. The cross-support beams commonly have notches which receive locking rings used to lock-in and support seats in the passenger compartment or cargo container systems in the cargo stowage compartment.

In existing aircraft designs, aircraft designers used several concepts to connect the combination of the inboard/outboard running deck support beams and the cross-support beams. Each concept used to date has drawbacks. In the earliest concept, both a lower flange and web of the cross-support beam were cut to make the cross-support beam the equivalent of a pin joint at the connection to the deck support beam. The upper flange of the cross-support beam was supported by the upper chord of the deck support beam. Several drawbacks exist with this concept. By cutting the cross-support beam, its continuous moment carrying capacity is lost. To regain moment carrying capacity, hardware including brackets and fasteners were used to splice the cross-support beam to the deck support beam at each cross-support beam to deck support beam intersection. Both the time to build the deck and the weight of the deck system increase using this design.

Another concept used by aircraft designers for deck assembly required the deck support beam be cut to provide clearance for the cross-support beam. Similar to the concept of cutting the cross-support beam, hardware, including fasteners and angle brackets, are required to splice the cross-support beam to the deck support beam at each aperture location in order to regain the moment carrying capability of the deck support beam. This design also has several drawbacks. Some reinforcement of the deck support beam is normally required due to the structural strength lost at the clearance cut. Also, by requiring hardware to re-splice the beam at each intersection with a cross-support beam, the amount of time required to build the deck is increased. Moreover, the weight of the overall deck increases due to both the additional reinforcement and hardware.

In more recent aircraft designs, each cross-support beam is entirely supported on the upper surface of each deck support beam upper chord. No cuts in either the deck support beam or the cross-support beam are required. The full moment carrying capacity of both the deck support beam and the cross-support beam are developed. The drawback of this concept is that the combined vertical height of the deck support beam and cross-support beam reduces the overhead clearance (or usable compartment volume) in the particular compartment. If the deck support beam or cross-support beam vertical heights are reduced to improve overhead clearance, structural weight increases due to the reduced moment carrying capability of shallower structures.

A need therefore exists for a deck design for joining deck support beams and cross-support beams which maximizes overhead compartment space, reduces the amount of hardware required to assemble the deck system, and optimizes the moment carrying capacity of the combination of the cross-support beams and the deck support beams.

SUMMARY OF THE INVENTION

In a preferred embodiment of the present invention, a deck support beam having a discontinuous upper chord includes an aperture in the deck support beam web to provide clearance for a cross-support beam. An upper support flange of the cross-support beam spans the aperture in the upper chord of the deck support beam. A web and lower stiffening flange of the cross-support beam are suspended in the aperture of the deck support beam. The support flange of the cross-support beam structurally re-splices the upper chord of the deck support beam across the aperture using a plurality of mechanical fasteners. Only the plurality of fasteners is required to join the cross-support beam at each intersection with the deck support beam. The shape of the cross-support beam is also optimized to support the weight of the deck throughout the length of the cross-support beam by changing the geometry of the cross-support beam in each span between deck support beams.

The deck support beam of the present invention is formed by machining the desired configuration from a solid block of metal. Both an upper and a lower chord are formed having a beam web joining the upper to the lower chord. A plurality of vertical ribs are also machined into the intermediate web approximately perpendicular to the beam web. At predetermined vertical ribs one end of the rib is bifurcated, thus providing a clearance opening formed as a generally U-shaped aperture through the upper chord and a portion of the beam web of the deck support beam. Adjacent to each U-shaped aperture, either a horizontal recess or a raised surface is also machined into an outer face of the upper chord of the deck support beam.

The cross-support beams of the present invention are preferably formed as either I-shaped or J-shaped beams. Each cross-support beam includes an upper support flange formed as a wide flange to span each U-shaped aperture, and a web joining the upper support flange to a stiffening flange. The stiffening flange is narrower than the upper support flange to allow both the stiffening flange and the web to be suspended within the U-shaped aperture formed in the deck support beam. A plurality of mechanical fasteners is used to join each upper support flange of a cross-support beam to a selected horizontal recess or raised surface on the deck support beam, thereby splicing the deck support beam in the area where each U-shaped aperture is formed without requiring additional hardware such as brackets or angles.

The size and geometry of both the deck support beam and the cross-support beam of the present invention can vary depending upon the span length and the spacing of the deck support beams and the weight carried by the deck of the aircraft. The gage thickness of the chords of the deck support beam as well as the depth of the deck support beam can be varied to provide the weight and moment carrying capacity necessary for the individual deck. By varying the width of the support flange of each cross-support beam along its fore and aft length as well as varying the depth or thickness of its stiffening flange, the moment carrying capacity and weight of the cross-support beam are optimized.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1A:
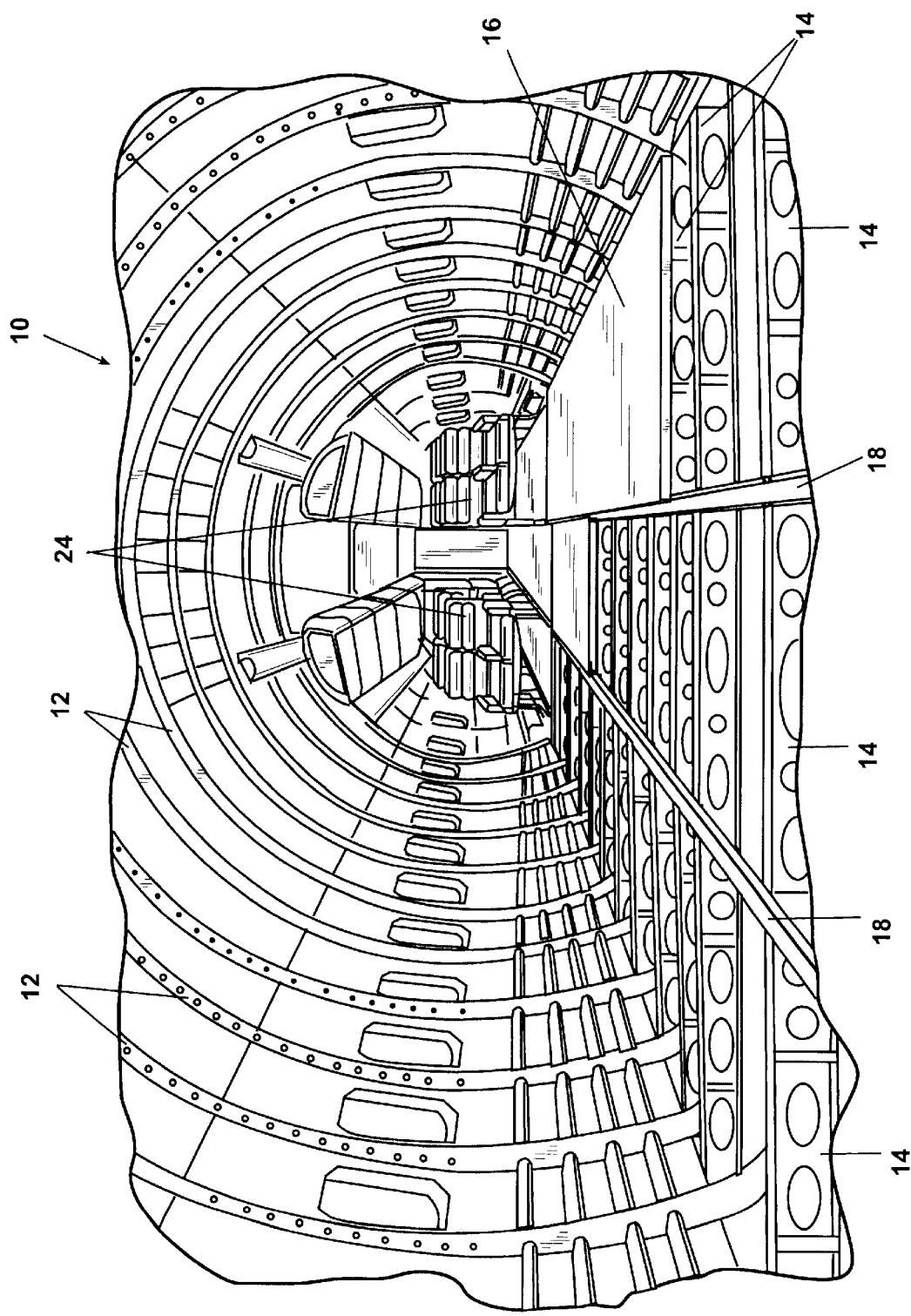
FIG. 1A is a perspective view of an aircraft known in the art having a plurality of deck support beams each supported by a sequential frame of the aircraft and a plurality of fore/aft running rails providing seat support.

Referring to FIG. 1A, an aircraft 10 having a support structure known in the art is shown. The aircraft 10 support structure includes a plurality of frames 12, a plurality of horizontally supported deck support beams 14, and deck plating 16. As known in the art, each deck support beam 14 is supported from one of the plurality of frames 12. A pair of cross-support beams 18 are also shown. The number of cross-support beams 18 can vary depending upon the individual aircraft design.

Figure 1B:
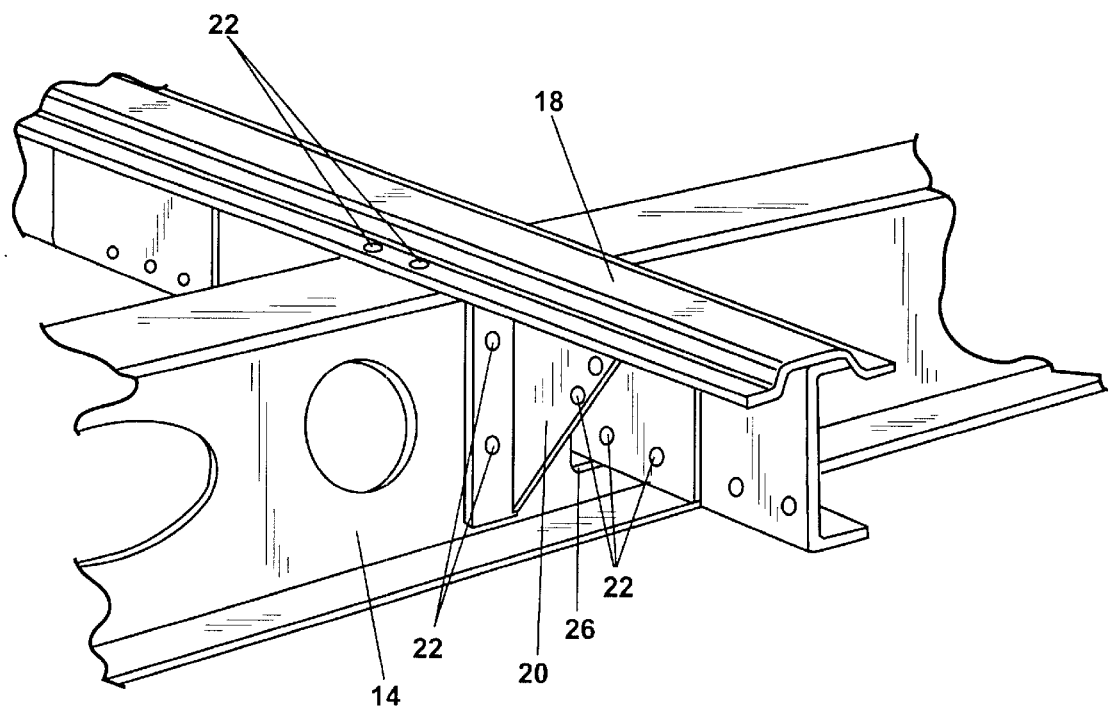
FIG. 1B is an enlarged view from FIG. 1A of a typical intersection between a cross-support beam known in the art at its intersection with a deck support beam.

Referring to FIG. 1B, an exploded view of a typical connection known in the art made between a cross-support beam 18 and a deck support beam 14 is shown. In the exemplary configuration shown, a portion of the deck support beam 14 is cut away providing an aperture 26 for at least the lower flange of the cross-support beam 18 to pass through. To structurally splice the deck support beam 14 together, support flanges 20 are mounted from the web of the deck support beam 14 and mechanically fastened to the cross-support beam 18. In addition, a plurality of fasteners 22 are applied through the cross-support beam 18 to an upper surface of the deck support beam 14.

Referring back to FIG. 1A, a plurality of seats 24 are shown mounted on the deck plating 16 and connectably fastened to the cross-support beam 18 using a plurality of clips (not shown) which are known in the art. A larger cross-support beam (not shown), similar to the cross-support beam 18 is substituted if the deck plating 16 and the deck support system is intended for cargo support rather than for passenger seating support. Minor changes to plate thicknesses, material and beam sizes are commonly made to incorporate the design shown in FIGS. 1A and 1B into a cargo storage deck.

Figure 2:
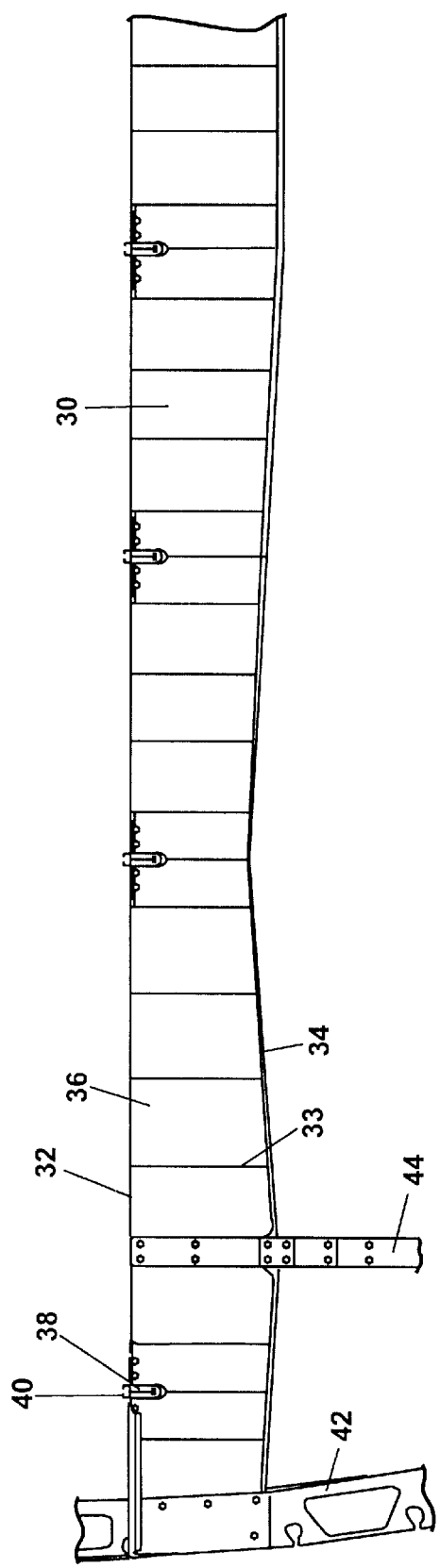
FIG. 2 is an elevation view looking forward showing a single deck support beam intersected by a plurality of cross-support beams of one embodiment the present invention.

Referring now to FIG. 2, a deck support beam 30 according to a preferred embodiment of the present invention is shown. The deck support beam 30 includes an upper chord 32, joined by a plurality of ribs 33 to a lower chord 34. In this embodiment, the deck support beam 30 is machined from a single block of metal, and a beam web 36 is provided between the upper chord 32 and the lower chord 34 together with the plurality of ribs 33. A plurality of generally T-shaped supports 38 are provided in each deck support beam 30. Each T-shaped support 38 is provided in a location where a cross-support beam 40 is supported. The cross-support beam 40 seats on the upper chord 32 and a portion of the cross-support beam 40 is suspended within the T-shaped support 38 as will be described in further detail below. As noted herein, a plurality of beam shapes can be used for the cross-support beams 40, including I-shaped beams, C-shaped beams, J-shaped beams and H-shaped beams. In one preferred embodiment shown in FIGS. 2, 4, and 5, a generally I-shaped beam is shown.

As known in the art, a plurality of deck support beams 30 are provided at one or more predetermined spacing(s). The spacing(s) is/are dependent upon a fore/aft distance between each of a plurality of frames 42 of the aircraft. The plurality of deck support beams 30 are arranged approximately parallel to each other. Each deck support beam 30 is typically mechanically fastened to one of the plurality of frames 42 and can also be supported by one or more vertical stanchions 44.

Figure 3:
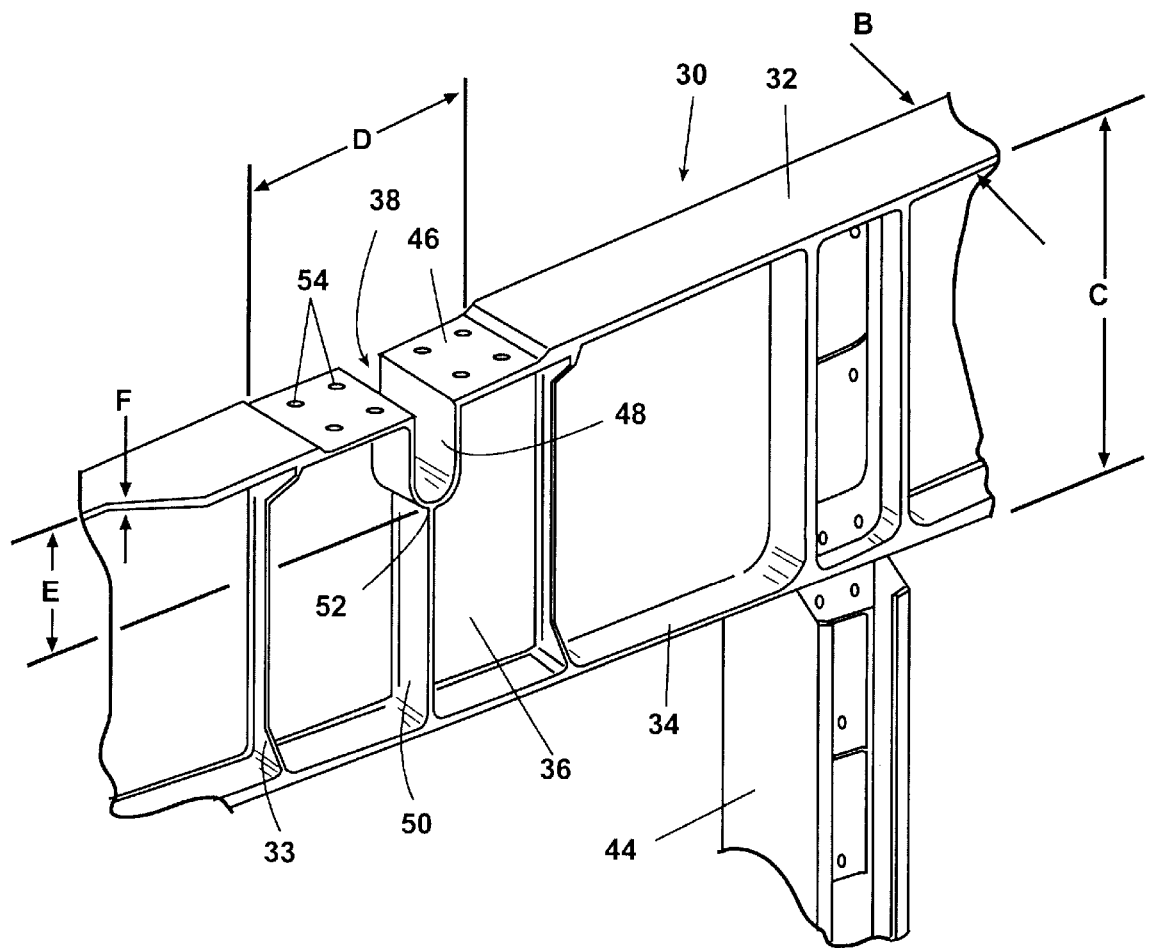
FIG. 3 is a perspective view including a U-shaped aperture and horizontal recess formed adjacent to a selected vertical rib in a deck support beam of the present invention.

Referring now to FIG. 3, the machined details of the T-shaped support 38 are shown in greater detail. Each upper chord 32 and each lower chord 34 are formed preferably by machining material from a solid block of metal. When forming the deck support beam 30, a plurality of ribs 33 are formed. Each rib 33 is formed approximately perpendicular to the beam web 36. The beam web 36 is approximately centrally located along a chord width B. At periodic locations along the upper chord 32, each of a plurality of horizontal recesses 46 are machined or otherwise formed, each having a horizontal recess width D. The horizontal recess width D can vary depending upon the deck application. In one preferred embodiment a nominal dimension for the horizontal recess width D is about 13.7 cm (5.4 in). The horizontal recess 46 opens on an outside facing side of the upper chord 32, i.e., opposite from the beam web 36 side of the upper chord 32.

Bisecting each horizontal recess 46 is a U-shaped aperture 48. Each U-shaped aperture 48 is formed in one of a plurality of preselected ribs 50 each having a bifurcated end 52. A plurality of fastener apertures 54 are provided in the horizontal recess 46 on both sides of the U-shaped aperture 48. Each fastener aperture 54 receives a mechanical fastener shown in greater detail in FIG. 4 to mechanically join the cross-support beam 40 to the horizontal recess 46.

The deck support beam 30 has a support beam height C forming a vertical envelope which will vary depending upon the type of deck design between about 7.6 cm (3.0 in) to about 27.9 cm (11 in) in an exemplary commercial aircraft design. The chord width B can vary in the exemplary embodiment shown between about 5.08 cm (2 in) to about 5.33 cm (2.1 in). A total aperture depth E has an exemplary dimension of about 5.9 cm (2⅓ in) in the embodiment shown. The aperture depth E can range from about 20% to about 50% of the total support beam height C. A chord thickness F is also shown. The chord thickness F can vary depending upon the deck design load, the free span between deck support beam 30 vertical supports and total height of the deck support beam 30. For the upper chord 32, the chord thickness F ranges between about 0.28 mm (0.11 in) to about 0.46 mm (0.18 in) for the exemplary embodiment shown. The lower chord 34 thickness is about 0.76 cm (0.30 in) in the exemplary embodiment shown.

Figure 4:
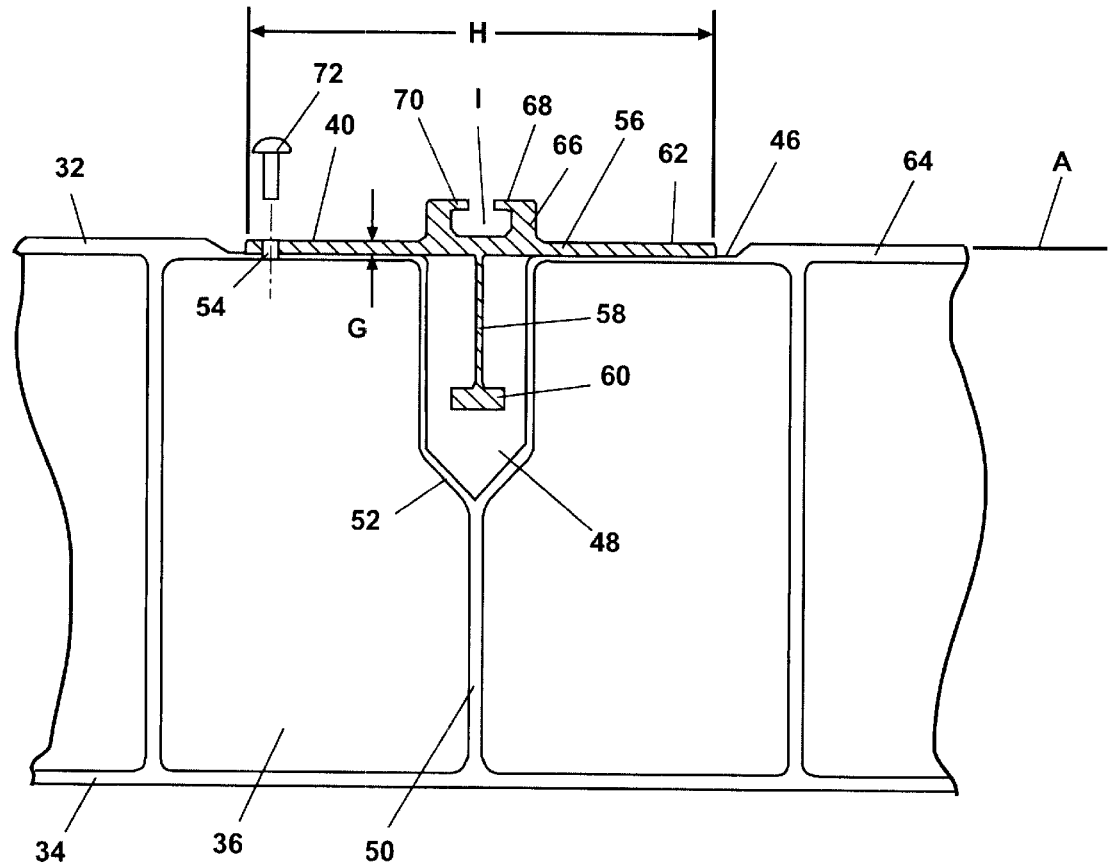
FIG. 4 is an enlarged side view of a portion of the deck support beam of FIG. 2, showing a cross-support beam support flange of the present invention seated in the horizontal recess of the deck support beam upper chord, and the web and stiffening flange of the cross-support beam suspended within the U-shaped aperture formed in the deck support beam web of the present invention.

Referring to FIG. 4, the cross-support beam 40 is shown seated in the horizontal recess 46. Each cross-support beam 40 includes a support flange 56, a web 58 and a stiffening flange 60. The support flange 56 seats within the horizontal recess 46 such that a support flange upper face 62 is in co-planer alignment on a plane A with a chord upper face 64. The web 58 and the stiffening flange 60 of the cross-support beam 40 are freely suspended within the U-shaped aperture 48.

Each preselected rib 50 includes the bifurcated end 52 having the U-shaped aperture 48 machined therein. FIG. 4 provides an alternate embodiment from that shown in FIG. 3, in that the U-shaped aperture 48 in FIG. 4 is shown having a generally angular shaped lower surface, wherein the U-shaped aperture 48 shown in FIG. 3 has a rounded bottom surface. The cross-support beam 40 has a support flange thickness G and a support flange width H. The support flange thickness G is sized appropriately for the deck support beam upper chord vertical load. Therefore, in the exemplary embodiment shown, the support flange thickness G is about 0.43 cm (0.17 in). In the exemplary embodiment, the support flange width H ranges from preferably about 12.7 cm (5.0 in) to about 13.5 cm (5.3 in). This allows the support flange 56 to fully seat within the horizontal recess 46. Both the support flange thickness G and the support flange width H can vary depending upon the strength and geometry of the desired deck configuration.

In a preferred embodiment, the cross-support beam 40 further includes a C-shaped channel 66. The C-shaped channel 66 includes a pair of flanges 68 and 70, respectively. The flanges 68 and 70 provide for a vertical opening 1. The C-shaped channel 66, together with the vertical opening 1, provide a channel forming either a seat track or a cargo track within which an aircraft seating assembly (similar to the seats 24 shown in FIG. 1) is locked, or a stowage container system (not shown) is located and locked as known in the art. The support flange 56 is mechanically connected to the horizontal recess 46 on both sides of the U-shaped aperture 48 using a plurality of fasteners 72. Each of the plurality of fasteners 72 are positioned within the fastener apertures 54 shown in both FIG. 4 and in FIG. 3. The combination of the support flange 56 and the plurality of fasteners 72 provide the splicing connection spanning each horizontal recess 46 formed in the upper chord 32.

Figure 5:
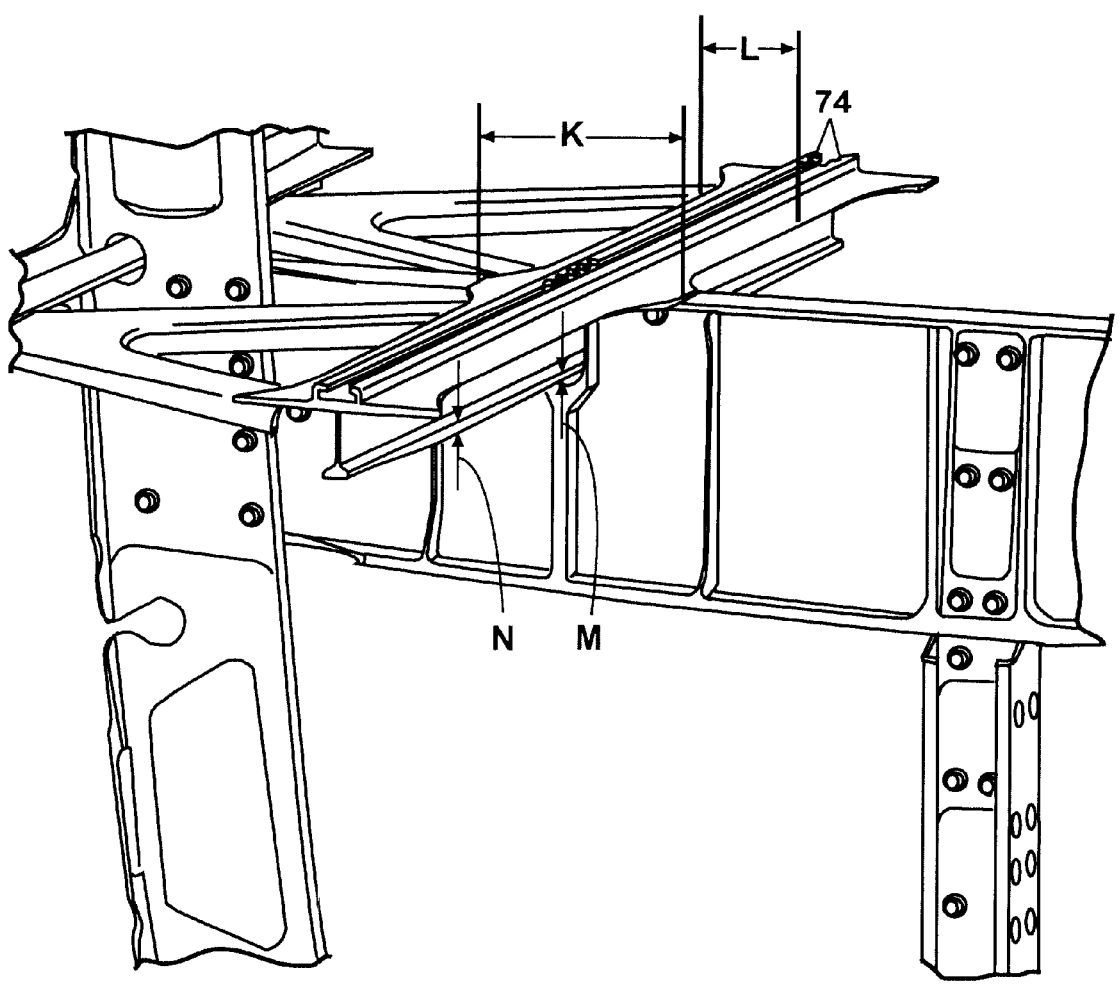
FIG. 5 is a perspective view showing a partial section view of a cross-support beam intersecting with a deck support beam showing the features of the present invention.

Referring now to FIG. 5, a partial configuration of one preferred embodiment of the present invention is shown. A cross-support beam 40 is shown in position approximately perpendicular to a deck support beam 30. The cross-support beam 40 has a support flange maximum width K adjacent to the horizontal recess 46, to provide a greater seating surface for the plurality of fasteners 72 shown in FIG. 4. Between each successive pair of deck support beams 30, a support flange minimum width L and thickness G (shown in Figure 4) are used. The support flange minimum width L is provided to reduce the overall weight of a cross-support beam 40 because the flange width does not add significantly to the vertical moment carrying capacity of the cross-support beam at mid-span between adjacent deck support beams 30.

At each intersection between a cross-support beam 40 and a U-shaped aperture 48 shown in FIG. 4, a stiffening flange minimum vertical cross section M is used. The vertical moment of the cross-support beam at its junction with the deck support beam is carried in part by the support flange maximum width K, therefore allowing the stiffening flange minimum vertical cross section M. The stiffening flange 60 deepens between each successive deck support beam 30 such that a stiffening flange maximum vertical cross section N is used at the mid-span between each successive deck support beam 30. The stiffening flange maximum vertical cross section N corresponds to the cross-support beam 40 mid-span location where the vertical moment on the cross-support beam 40 from the deck load is greatest, i.e., between each pair of deck support beams 30 where the vertical support from the deck support beams 30 is lowest.

FIG. 5 also shows a plurality of notches 74. The notches 74 are provided to locate and lock-in a seat or cargo locking ring (not shown). The notches 74 and locking rings are well known in the art and will not be discussed further herein.

Referring back to FIGS. 2 through 4, the vertical height of the deck support beam 30 can vary to support different deck loads. The support beam height C (identified in FIG. 3) can vary as shown in FIG. 2 along the horizontal length of each deck support beam 30. In the embodiment shown, each upper chord 32 of each deck support beam 30 identified in FIG. 4 is approximately aligned with the plane A to provide a level deck support surface, requiring the lower chord 34 to change elevation to accommodate a changing support beam height C.

Figure 6:
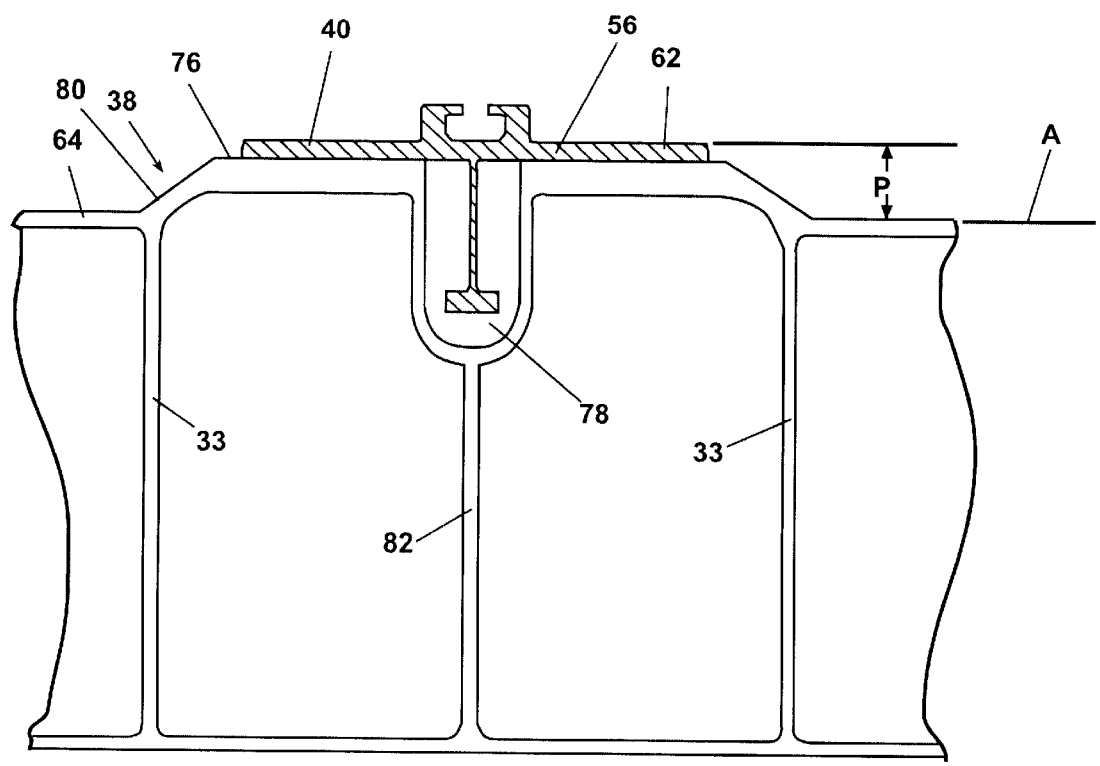
FIG. 6 is an enlarged side view of another embodiment of the present invention deck support beam of FIG. 2, showing a cross-support beam support flange of the present invention seated on a raised surface of the deck support beam upper chord, and the web and stiffening flange of the cross-support beam suspended within the U-shaped aperture formed in the deck support beam web of the present invention.

Referring to FIG. 6, another preferred embodiment of the present invention provides the T-shaped support 38 as a raised surface 76 bisected by a U-shaped aperture 78. The U-shaped aperture 78 is similar in shape and function to the U-shaped aperture 48. In this embodiment the support flange 56 of the cross-support beam 40 is raised above the plane A of the chord upper face 64 to provide corrosion protection between the cross-support beam 40 and the chord upper face 64 by allowing moisture runoff along a pair of tapered shoulders 80. The support flange upper face 62 is raised to a support flange height P. The support flange height P is approximately 1.2 cm (0.5 in) above the plane A. Deck plating (not shown) will be supported by the support flange upper face 62 above the chord upper face 64 which will provide additional corrosion protection by separating the deck plating from the chord upper face 64. The U-shaped aperture 78 is formed from a preselected rib 82 which is similar to the preselected rib 50.

Referring back to FIGS. 1A, 4 and 6, the deck plating 16, known in the art, is typically positioned adjacent to the outboard (i.e., outside vertical) faces of each C-shaped channel 66. Each C-shaped channel 66 is therefore exposed after deck plating installation such that the locking rings (not shown, but discussed above) can be applied in each of the notches 74 to retain either the exemplary arrangement of seats 24 shown in FIG. 1B or a cargo container system (not shown).

In a preferred embodiment of the present invention, each deck support beam 30 is manufactured by machining the features of the beam from a single piece of aluminum material. However, it will be appreciated that any metal having mechanical properties and weight characteristics suitable for aircraft use can be used for the deck support beam. With appropriate controls during forming/machining, laminate or composite materials can also be used for the deck support beams of the present invention. The cross-support beams of the present invention are also preferably formed from an aluminum material, however alternate materials noted above can also be substituted. Fasteners 72 can be selected from a variety of mechanical fastener types including bolts, studs and rivets. Other methods of building the deck support beam can be used, including weld buildup of the beam from individual parts. Apertures (similar to those shown in FIG. 1) can also be provided within each beam web 36 to reduce deck support beam weight or to provide through-passage of equipment including electrical wire-ways, piping and structure. These apertures are known in the art and will therefore not be described further herein.

The stiffening flange minimum vertical cross section M, in a preferred embodiment of the present invention, is preferably about 0.48 cm (0.19 in). The stiffening flange maximum vertical cross section N, in a preferred embodiment of the present invention, is preferably about 0.86 cm (0.34 in). The stiffening flange cross section dimensions can vary, as well as a thickness of the web 58, depending upon the load to be carried by the cross-support beam 40, the size and geometry of the deck support beam 30, and the material selected for both components.

The aircraft floor design of the present invention offers several advantages. By initially machining the U-shaped aperture 48 of the present invention into the deck support beam 30, the cross-support beam 40 can be supported by the deck support beam without making cuts in the beam web 36 or the cross-support beam 40. Additional fasteners and support flanges known in the art that are used to re-splice the cuts made in either the deck support beam or the cross-support beam are eliminated by the present invention. By providing a T-shaped support in the upper chord of the deck support beam, the support flange of the cross-support beam seats on the support, allowing deck plating to be butted adjacent to the C-shaped channel of the cross-support beam. By varying a width of the support flange of the cross-support beam and a vertical cross section of its stiffening flange, vertical load support provided by the deck support beam is included in the cross-support beam design to locally reduce stiffening flange cross section, while the increased vertical support necessary at mid-span between individual deck support beams is also provided.

The description of the invention is merely exemplary in nature and, thus, variations that do not depart from the gist of the invention are intended to be within the scope of the invention. Such variations are not to be regarded as a departure from the spirit and scope of the invention. Variations can include use of the support structure of the present invention in non-aircraft applications, including other vehicle types, ships and movable structures where space or weight savings can be realized.

What is claimed is:

1. A floor structural support device adapted for use on a mobile platform comprising:
    a plurality of approximately parallel aligned support beams each having a first chord and a second chord, an intermediate web joining said first chord to said second chord, and a plurality of ribs each formed perpendicular to said intermediate web and joining said first chord to said second chord;
    at least one of said ribs of each said support beam having a bifurcated end forming an aperture through said intermediate web; and
    at least one cross-support beam being disposed approximately perpendicular to said support beams, said one cross-support beam including at least one support flange each mechanically connected adjacent to a preselected one of said at least one of said ribs having said bifurcated end and both a web and a stiffening flange freely suspended within said aperture.

2. The device of claim 1, wherein each said support beam of said plurality of support beams has a predetermined spacing to an adjacent one of said plurality of support beams.

3. The device of claim 2, wherein said aperture forms a U-shape having a depth ranging from about 20 percent to about 50 percent of a height of said intermediate web.

4. The device of claim 3, wherein said first chord comprises an inward face connectably joined to both said intermediate web and said plurality of ribs, and an outward face.

5. The device of claim 4, further comprising:
    each said first chord having at least one outside facing recess formed in said outward face, each said outside facing recess bisected by one of said apertures; and
    said support flange of each of said cross-support beams being mechanically connected at predetermined ones of said at least one outside facing recess of each of said support beams.

6. The device of claim 5, wherein each said outside facing recess being bisected by one of said apertures forms a pair of recess mating faces.

7. The device of claim 6, wherein said support flange of said cross-support beam further comprises a support face bisected by said web to form a pair of support flange mating faces, each of said pair of mating faces mating with one of said recess mating faces.

8. The device of claim 7, wherein each said support flange mating face and its mating recess mating face are fastenably connected by a plurality of mechanical fasteners.

9. The device of claim 4, further comprising:
    each said first chord having at least one raised surface formed in said outward face, each said raised surface bisected by one of said apertures; and
    said support flange of each of said cross-support beams being mechanically connected at predetermined ones of said at least one raised surface of each of said support beams.

10. The device of claim 9, wherein each said support flange is matably fastened to a select one of said at least one raised surface using a plurality of mechanical fasteners.

11. An aircraft deck structural support system comprising:
    a plurality of horizontally arranged deck support beams each having a plurality of cross-support beam attachment faces machined therein;
    a U-shaped aperture bisecting each of said plurality of cross-support beam attachment faces, each said U-shaped aperture formed in a beam web of each said deck support beam;

each said cross-support beam attachment face matingly receiving an attachment flange of one of a plurality of cross-support beams disposed approximately perpendicular to said plurality of deck support beams; and each said cross-support beam including a web perpendicularly connected at an upper end to said attachment flange and a stiffening flange integrally joined to a lower end of said web, both said web and said stiffening flange being freely suspended within said U-shaped aperture.

12. The aircraft deck system of claim 11, further comprising said plurality of deck support beams each having opposed ends connectably fastened to one of a plurality of aircraft frames.

13. The aircraft deck system of claim 12, wherein each said deck support beam comprises a first end of said beam web perpendicularly joined to said upper chord, and a second end of said beam web perpendicularly joined to a lower chord.

14. The aircraft deck system of claim 13, wherein each said deck support beam further comprises a vertical envelope bounded between said upper chord and said lower chord.

15. The aircraft deck system of claim 14, further comprising:

each of said cross-support beam attachment faces including a horizontal recess formed in an upper chord of each said deck support beam;

each said cross-support beam connects to each of said plurality of deck support beams within said vertical envelope of each said deck support beam such that an upper face of said attachment flange is in coplanar alignment with a top face of said upper chord.

16. The aircraft deck system of claim 15, wherein said stiffening flange of each said cross-support beam has a minimum vertical cross section adjacent to each said U-shaped aperture, transitioning to a maximum vertical cross section at a center span location equidistant between any adjacent pair of said deck support beams.

17. The aircraft deck system of claim 16, wherein said attachment flange of each said cross-support beam has a maximum width adjacent to its intersection with each said upper chord and a minimum width in a span between any adjacent pair of said deck support beams.

18. The aircraft deck system of claim 17, wherein said attachment flange further comprises an integrally formed C-shaped channel, said C-shaped channel having a vertically upward facing opening, an opposed pair of flanges bounding said opening, and a plurality of notches sequentially aligned between said pair of flanges.

19. The aircraft deck system of claim 18, wherein each said C-shaped channel forms one of a seat track and a cargo track, for which said plurality of notches and said opposed pair of flanges forms a temporary locking mechanism.

20. The aircraft deck system of claim 14, further comprising:

each of said cross-support beam attachment faces including a horizontal raised surface formed on an upper chord of each said deck support beam;

each said cross-support beam connects to each of said plurality of deck support beams within said vertical envelope of each said deck support beam such that an upper face of said attachment flange is disposed at a deck support beam highest elevation above said raised surface on said upper chord.

21. A method to construct an aircraft deck support structure comprising the steps of:

machining a plurality of generally T-shaped supports in each of a plurality of deck support beams;

forming an upper section of each T-shaped support as one of a horizontal recess in an upper chord of each said deck support beam and a raised surface on said upper chord;

cutting a U-shaped aperture in a beam web of each said deck support beam forming a lower section of each T-shaped support;

matably fastening an attachment flange of one of a plurality of cross-support beams at each upper section, each said cross-support beam being arranged approximately perpendicular to said plurality of deck support beams; and freely suspending both a web and a stiffening flange of each said cross-support beam within said U-shaped aperture of each said T-shaped recess.

22. The method of claim 21, further comprising the step of connectably fastening each of said plurality of deck support beams to one of a plurality of aircraft frames to form a horizontal, generally coplanar arrangement of each said upper chord.

23. The method of claim 22, further comprising the step of attaching each of a plurality of deck support plates to selected ones of said plurality of deck support beams.

24. The method of claim 23, further comprising the step of forming a C-shaped channel on an upper surface of each of said plurality of cross-support beams.

25. The method of claim 24, further comprising the step of forming a plurality of notches in each said C-shaped channel for removably attaching one of a seat assembly and a cargo container system to each said C-shaped channel.

26. The method of claim 25, further comprising the step of forming a plurality of ribs in said beam web of each said deck support beam.

27. The method of claim 26, further comprising the step of forming each said U-shaped aperture as a bifurcated end of a preselected rib of said plurality of ribs.

28. The method of claim 21, further comprising the step of forming each of said plurality of cross-support beams having said web perpendicularly joined at an upper end to said attachment flange, and said stiffening flange integrally joined to a lower end of said web.

* * * * *